United States Patent
Tseng (10) Patent No.: US 8,885,330 B2
(45) Date of Patent: Nov. 11, 2014

(54) PORTABLE ELECTRONIC DEVICE WITH SUPPORT FUNCTION

(75) Inventor: Tien-Chung Tseng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 255 days.

(21) Appl. No.: 13/467,064

(22) Filed: May 9, 2012

(65) Prior Publication Data

US 2013/0063882 A1 Mar. 14, 2013

(30) Foreign Application Priority Data

Sep. 13, 2011 (TW) .............................. 100132842 A (51) Int. Cl.
G06F 3/02 (2006.01)
G06F 1/16 (2006.01)

(52) U.S. Cl.
CPC ............ *G06F 1/1666* (2013.01); *G06F 1/1662* (2013.01)
USPC .................... 361/679.08; 361/679.09; 341/22

(58) Field of Classification Search
CPC ... G06F 1/3287; G06F 1/1662; G06F 3/0202; G06F 3/0234; G06F 1/1613; G06F 1/16; G06F 1/1616; G06F 1/1632; G06F 19/10; G06F 1/1681; G06F 1/1601; G06F 1/162; G06F 1/1624; G06F 1/1637; G06F 1/1669; G06F 3/01; G06F 1/1667; G06F 2200/1633; G06F 1/1666; H05K 5/0226; H05K 7/12; H05K 5/0221; H05K 7/00; H05K 7/14
USPC ............. 361/679.01, 679.02, 679.08, 679.09, 361/679.21, 679.26, 679.27, 361/679.11–679.16; 248/917–924; 341/22–33; 345/168–172; 455/575.1–575.4; 379/433.11–433.13; 400/472–496
See application file for complete search history.

(56) References Cited

U.S. PATENT DOCUMENTS

| | | | | |
|---|---|---|---|---|
| 5,490,037 | A * | 2/1996 | Clancy ..................... | 361/679.55 |
| 6,181,361 | B1 * | 1/2001 | Bluteau et al. ............... | 347/222 |
| 6,771,493 | B2 * | 8/2004 | Chen ........................ | 361/679.11 |
| 2007/0222754 | A1 * | 9/2007 | Chen et al. .................... | 345/163 |

OTHER PUBLICATIONS

Office action mailed on Apr. 3, 2014 for the Taiwan application No. 100132842, filing date: Sep. 13, 2011, p. 1 line 14, p. 2-3 and p. 4 line 1-5.

* cited by examiner

*Primary Examiner* — Anthony Haughton
*Assistant Examiner* — Ingrid Wright
(74) *Attorney, Agent, or Firm* — Winston Hsu; Scott Margo (57) ABSTRACT

A portable electronic device includes a lower cover, a keyboard disposed on the lower cover, an upper cover pivotally connected to a side of the lower cover, a support target member disposed on the upper cover, a support frame, and a first driving part. The support frame has at least one first inclined surface structure. A second inclined surface structure is formed at a position of the first driving part corresponding to the first inclined surface structure. When the first driving part moves in a first direction to drive the support frame to a support position in a second direction, the second inclined surface structure supports the first inclined surface structure so that the support frame can support the support target member when the upper cover covers the lower cover.

20 Claims, 9 Drawing Sheets

PORTABLE ELECTRONIC DEVICE WITH SUPPORT FUNCTION

BACKGROUND OF THE INVENTION

1. Field of the Invention

The present invention relates to a portable electronic device, and more specifically, to a portable electronic device with a support function.

2. Description of the Prior Art

In recent years, a portable electronic device is widely used in daily life, such as a notebook. Since the portable electronic device is convenient for a user to carry, the portable electronic device has gradually replaced a desktop computer to be a major platform for digital operations (e.g. paperwork processing or internet browsing).

Judging from a notebook's outer appearance, the notebook is composed of upper and lower covers which can be folded or expanded relatively, a liquid crystal display panel disposed on the upper cover for displaying images, and a keyboard disposed on the lower cover for input operations. Accordingly, it is convenient for a user to open the upper cover to operate the notebook or fold the upper cover upon the lower cover to carry the notebook. However, since the prior art only utilizes a glass cover of the liquid crystal display panel and rubber pads attached around the keyboard to absorb impact received by the notebook in a folded state (at this time, the upper cover is folded upon the lower cover), the glass cover may be broken easily due to excessive impact. The aforesaid condition may cause leakage of liquid crystal in the liquid crystal display panel so as to damage the notebook seriously.

SUMMARY OF THE INVENTION

The present invention provides a portable electronic device with a support function. The portable electronic device includes a lower cover, a keyboard, an upper cover, a support target member, a support frame, and a first driving part. The keyboard is disposed on the lower cover and has a plurality of keyswitches. The upper cover is pivotally connected to a side of the lower cover. The support target member is disposed on the upper cover. The support frame is movably disposed on the keyboard and has at least one first inclined surface structure and a plurality of holes formed thereon corresponding to the plurality of keyswitches. The first driving part is movably disposed between the keyboard and the lower cover and has a second inclined surface structure thereon corresponding to the first inclined surface structure. The second inclined surface structure is used for sliding relative to the first inclined surface structure when the first driving part moves in a first direction relative to the support frame, so as to drive the support frame to move between a retracted position and a support position in a second direction. When the support frame moves to the support position, the second inclined surface structure supports the first inclined surface structure for supporting the support frame above the keyboard, so that the support frame can support the support target member when the upper cover covers the lower cover.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
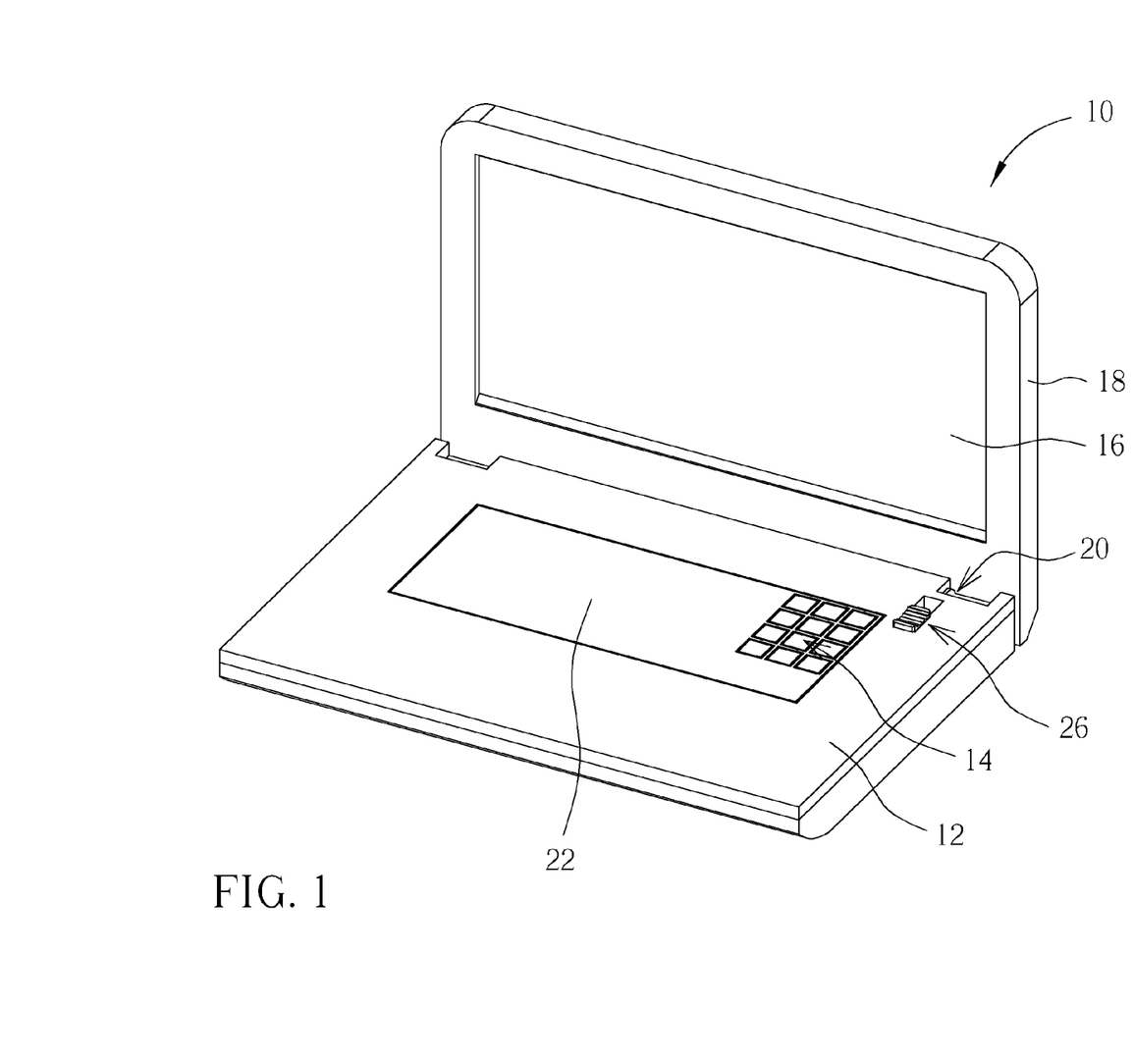
FIG. 1 is a diagram of a portable electronic device according to a first embodiment of the present invention.
Figure 2:
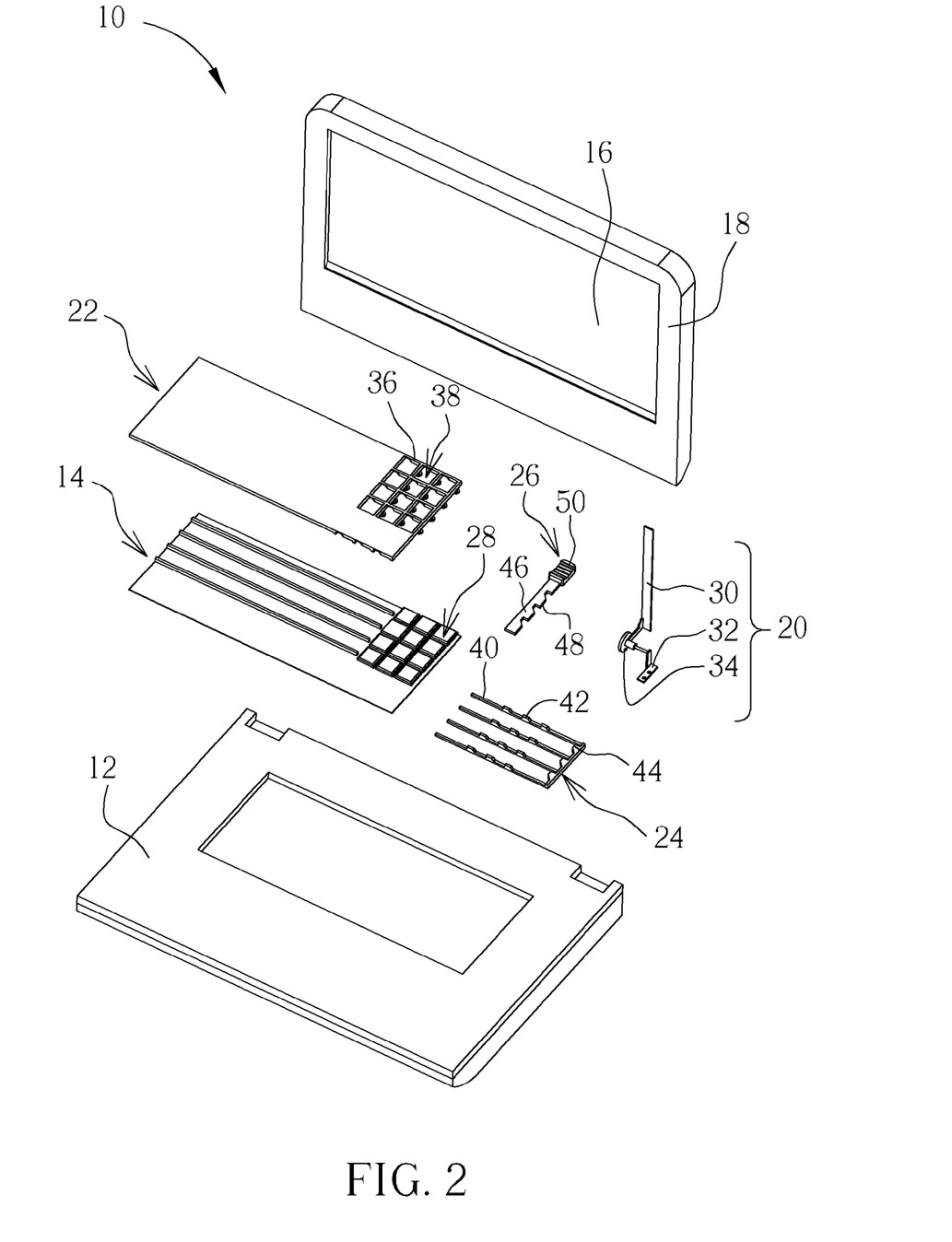
FIG. 2 is an exploded diagram of the portable electronic device in FIG. 1.

Please refer to FIG. 1 and FIG. 2. FIG. 1 is a diagram of a portable electronic device 10 according to a first embodiment of the present invention. FIG. 2 is an exploded diagram of the portable electronic device 10 in FIG. 1. As shown in FIG. 1 and FIG. 2, the portable electronic device 10 includes a lower cover 12, a keyboard 14, a support target member 16, an upper cover 18, a shaft part 20, a support frame 22, a first driving part 24, and a second driving part 26. The keyboard 14 is disposed on the lower cover 12 and has a plurality of keyswitches 28 to press for performing input operations of the portable electronic device 10. In this embodiment, the support target member 16 can be a liquid crystal panel disposed on the upper cover 18 for displaying images, but is not limited thereto, meaning that the support target member 16 can also be other fragile component disposed on the upper cover 18. The shaft part 20 is pivotally connected to the upper cover 18 and the lower cover 12. In this embodiment, the shaft part 20 can include an upper-cover connecting portion 30, a lower-cover connecting part 32 and a pivot portion 34. The upper-cover connecting portion 30 is fixed to the upper cover 18. The lower-cover connecting portion 32 is fixed to the lower cover 12. The pivot portion 34 is connected to the upper-cover connecting portion 30 and pivotally connected to the lower-cover connecting portion 32. Accordingly, the upper cover 18 can be rotatable relative to the lower cover 12 via the shaft part 20, but is not limited thereto. In other words, the upper cover 18 can utilize other shaft design commonly seen in the prior art to be pivotally connected to the lower cover 12, or can be pivotally connected to a side of the lower cover 12 directly without the shaft part 20.

The support frame 22 has at least one first inclined surface structure 36 (twelve shown in FIG. 2, but not limited thereto), and has a plurality of holes 38 corresponding to the plurality of keyswitches 28. In such a manner, the support frame 22 can be movably disposed on the keyboard 14 via the holes 38 cooperating with the keyswitches 28.

The first driving part 24 is movably disposed between the keyboard 14 and the lower cover 12 and has at least one first driving rod portion 40 (four shown in FIG. 2). As shown in FIG. 2, the first driving part 24 further has a second inclined surface structure 42 corresponding to the first inclined surface structure 36 and at least one fourth inclined surface structure 44 (three shown in FIG. 2). The second inclined surface structure 42 is formed on the first driving rod portion 40 and is capable of sliding relative to the first inclined surface structure 36.

The second driving part 26 is movably disposed on the first driving part 24 and has a second driving rod portion 46. The second driving part 26 further has a third inclined surface structure 48 corresponding to the fourth inclined surface structure 44. The third inclined surface structure 48 is formed on the second driving rod portion 46 and is capable of sliding relative to the fourth inclined surface structure 44. In practical application, the second driving part 26 can further has a push button portion 50 for a user to push. Furthermore, the second inclined surface structure 42 and the third inclined surface structure 48 are not limited to be formed on the driving rod portion of the driving part. In other words, all structural designs for forming inclined surface structures, which cooperate with each other, on the support frame and the driving part or on the driving parts may fall within the scope of the present invention.

Figure 3:
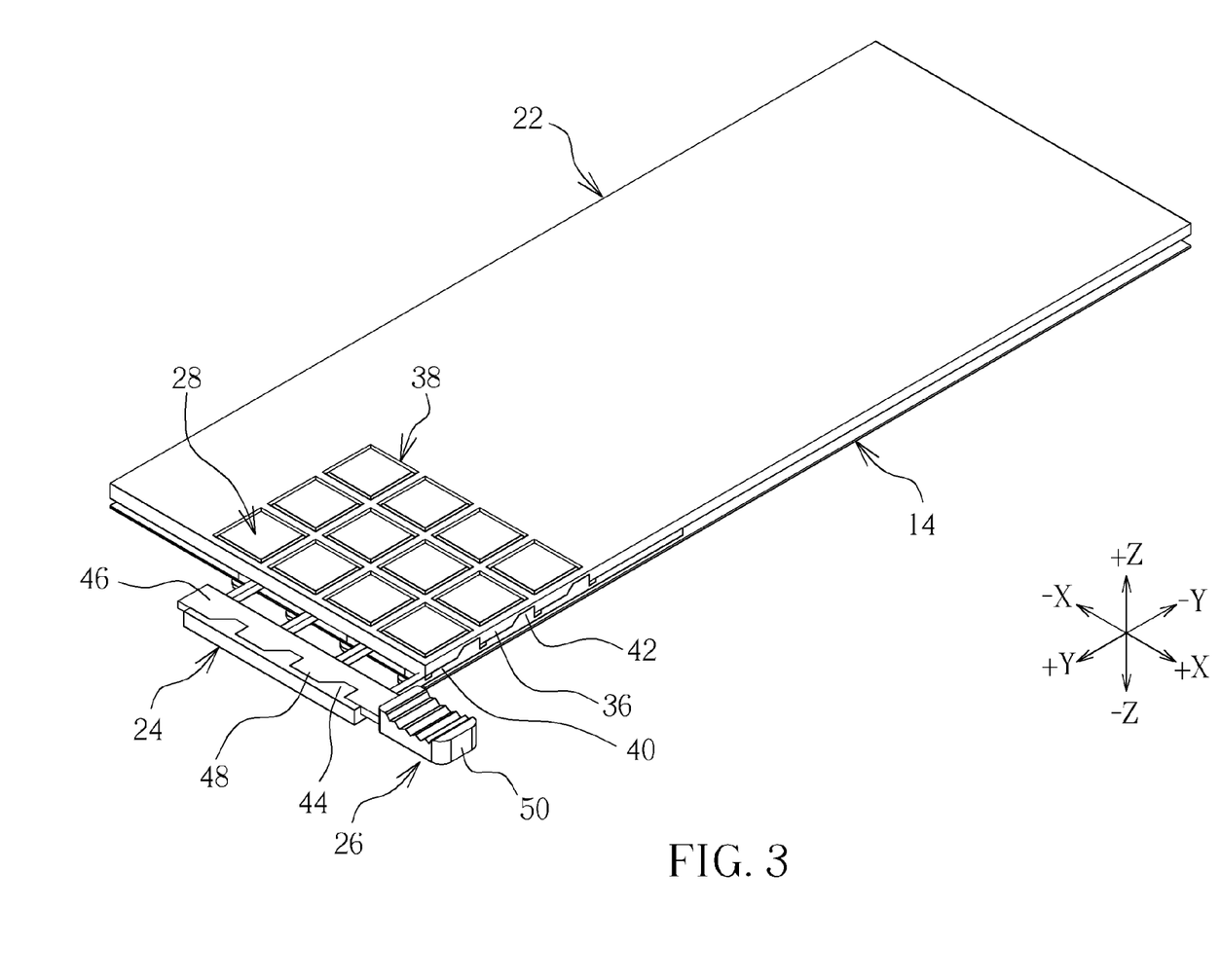
FIG. 3 is an enlarged diagram of a support frame in FIG. 1 when being located at a retracted position, a keyboard, a first driving part, and a second driving part.
Figure 4:
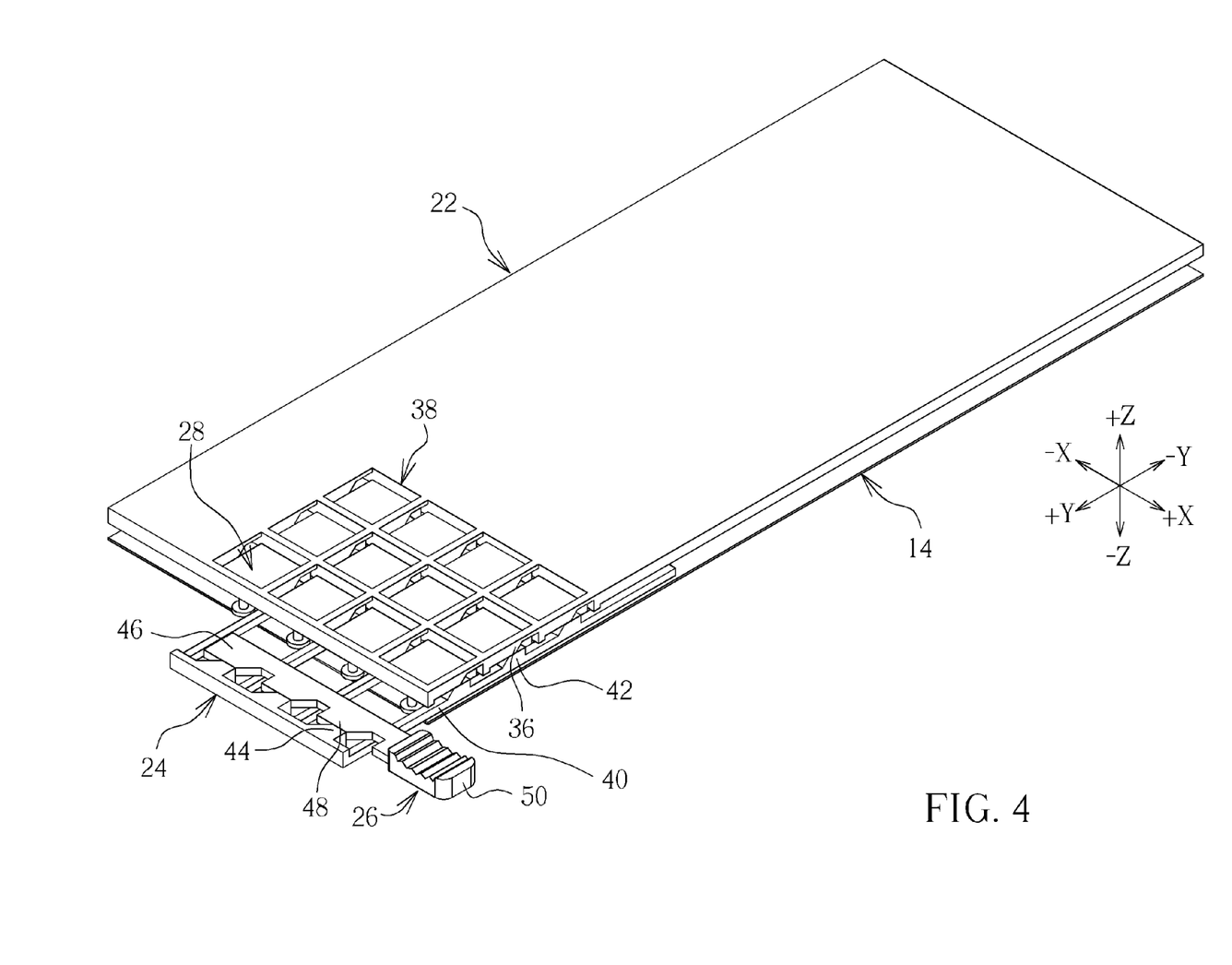
FIG. 4 is an enlarged diagram of the support frame in FIG. 1 when being located at a support position, the keyboard, the first driving part, and the second driving part.

More detailed description for the linkage design of the support frame 22 is provided as follows. Please refer to FIG. 3 and FIG. 4. FIG. 3 is an enlarged diagram of the support frame 22 in FIG. 1 when being located at a retracted position, the keyboard 14, the first driving part 24, and the second driving part 26. FIG. 4 is an enlarged diagram of the support frame 22 in FIG. 1 when being located at a support position, the keyboard 14, the first driving part 24, and the second driving part 26.

Before a user wants to fold the upper cover 18 upon the lower cover 12, the user can push the push button portion 50 of the second driving part 26 first, so as to drive the second driving part 26 to move toward a +X-axis direction from a position as shown in FIG. 3 to a position as shown in FIG. 4. During the aforesaid process, the third inclined surface structure 48 slides relative to the fourth inclined surface structure 44 with motion of the second driving part 26, so as to push the first driving part to move toward a +Y-axis direction from a position as shown in FIG. 3 to a position as shown in FIG. 4. At the same time, the second inclined surface structure 42 also slides relative to the first inclined surface structure 36 of the support frame 22 with motion of the first driving part 24, so as to push the support frame 22 to move upwardly toward +Z-axis direction.

Figure 5:
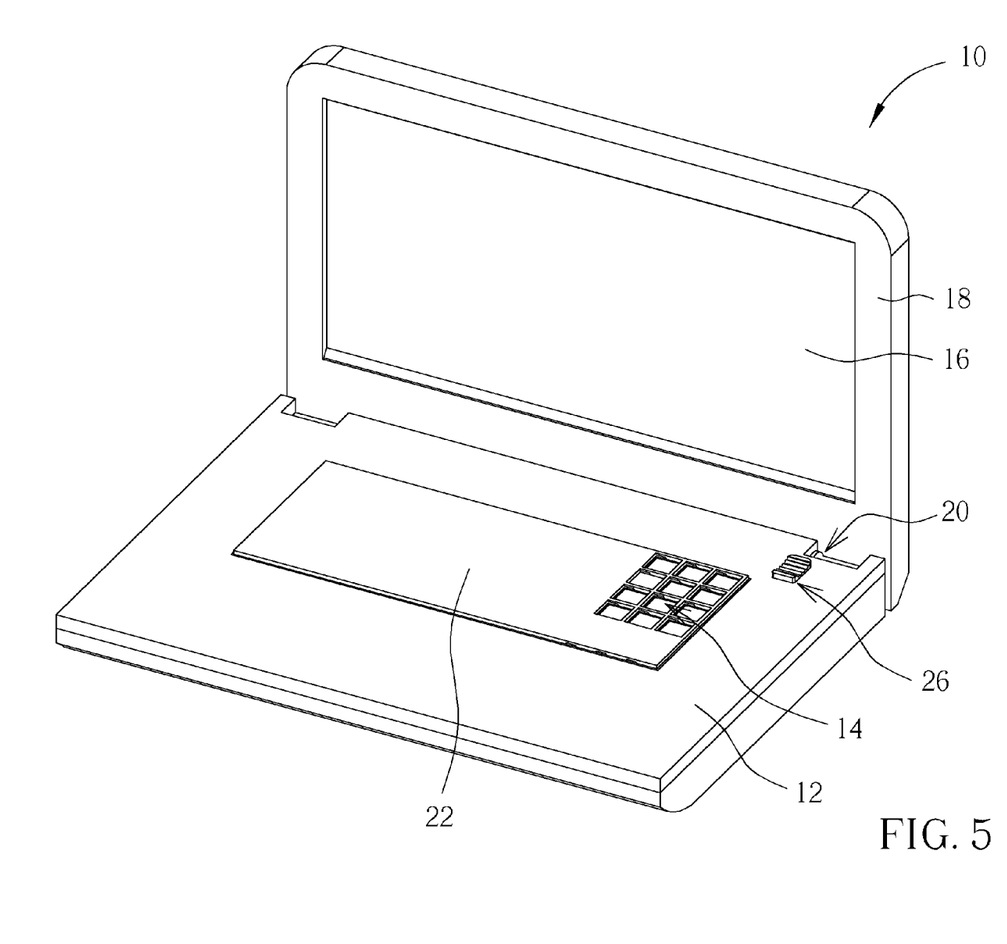
FIG. 5 is a diagram of the portable electronic device when the support frame is located at the support position.

That is to say, via sliding of the third inclined surface structure 48 relative to the fourth inclined surface structure 44 and sliding of the second inclined surface structure 42 relative to the first inclined surface structure 36, the support frame 22 can be driven to move upwardly with motion of the second driving part 26 from the retracted position as shown in FIG. 3 to the support position as shown in FIG. 4, so that the portable electronic device 10 can have a support function by utilizing the support frame 22 protruding from the keyboard 14. The related configuration can be as shown in FIG. 5, which is a diagram of the portable electronic device 10 when the support frame 22 is located at the support position.

In such a manner, after the upper cover 18 is folded upon the lower cover 12, the support frame 22 protruding from the keyboard 14 can contact the support target member 16 disposed on the upper cover 18, and then provide sufficient support force to the support target member 16. Thus, damage of the support target member 16 (e.g. a break of a glass cover of a liquid crystal display panel) can be avoided efficiently when the support target member is pressed.

On the other hand, before the user opens the upper cover 18 to operate the portable electronic device 10, the user can push the push button portion 50 of the second driving part 26 to move the second driving part 26 toward a −X-axis direction from the position as shown in FIG. 4 to the position as shown in FIG. 3. At this time, since the fourth inclined surface structure 44 is no longer abutted against the third inclined surface structure 48, the first driving part 24 can be moved toward a −Y-axis direction from the position as shown in FIG. 4 to the position as shown in FIG. 3 manually or by a conventional automatic return design (e.g. utilizing a spring disposed between the first driving part 24 and the keyboard 14 to make the first driving part 24 return automatically), so as to make the fourth inclined surface structure 44 cooperate with the third inclined surface structure 48 again. At the same time, the second inclined surface structure 42 also moves toward the −Y-axis direction from the position as shown in FIG. 4 to the position as shown in FIG. 3 with motion of the first driving part 24. Accordingly, since the first inclined surface structure 36 is no longer supported by the second inclined surface structure 42, the support frame 22 is pulled by gravity to move downwardly toward a −Z-axis direction from the support position as shown in FIG. 4 until the first inclined surface structure 36 cooperates with the second inclined surface structure 42 to make the support frame 22 located at the retracted position.

In brief, the support frame 22 can move downwardly from the support position as shown in FIG. 4 to the retracted position as shown in FIG. 3 with motion of the second driving part 26, so as to make the keyswitches 28 of the keyboard 14 protrude from the holes 38 (as shown in FIG. 1) for the user to press conveniently.

Figure 6:
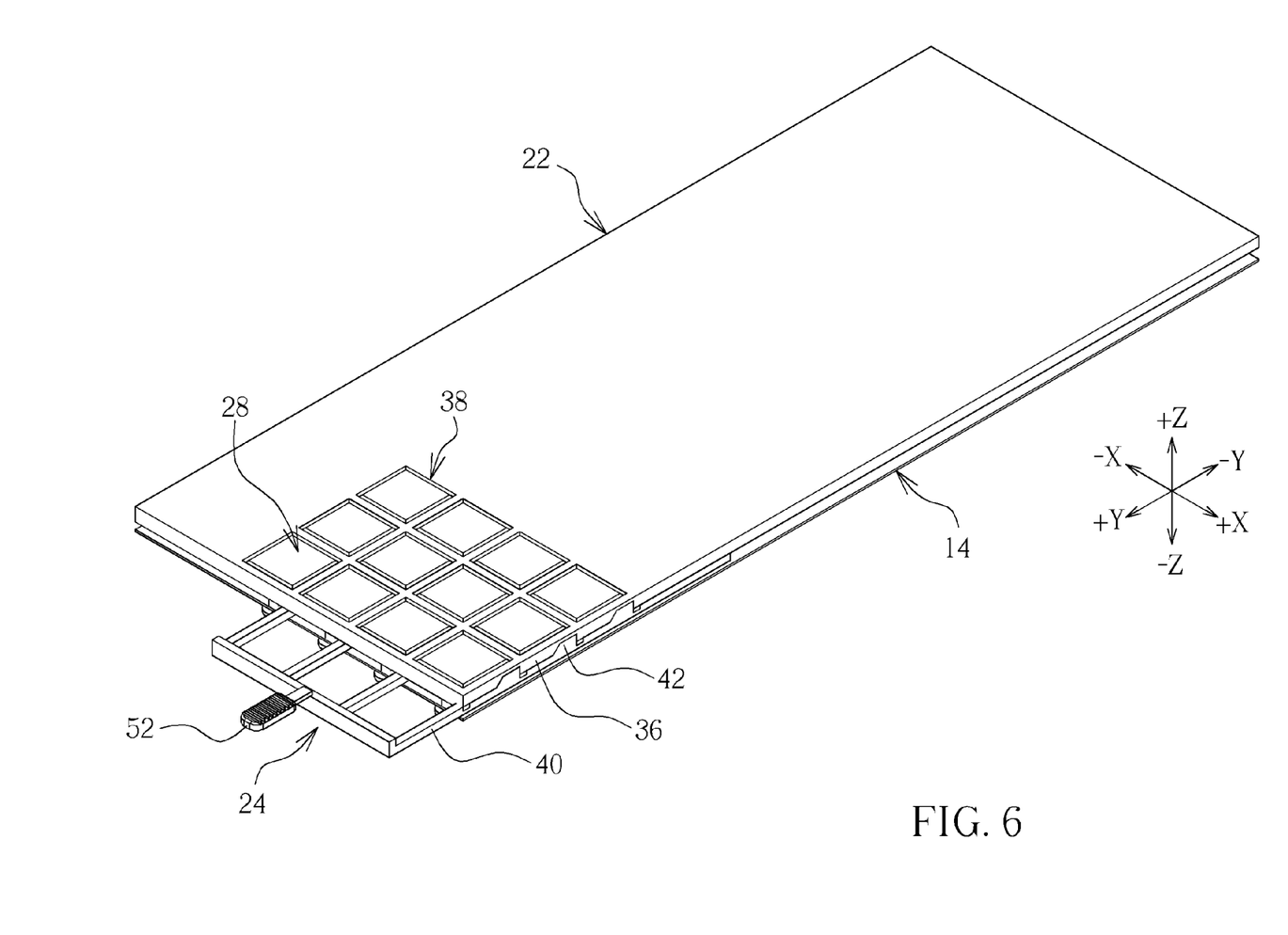
FIG. 6 is a diagram of the first driving part driving the support frame to move downwardly to the retracted position according to a second embodiment of the present invention.
Figure 7:
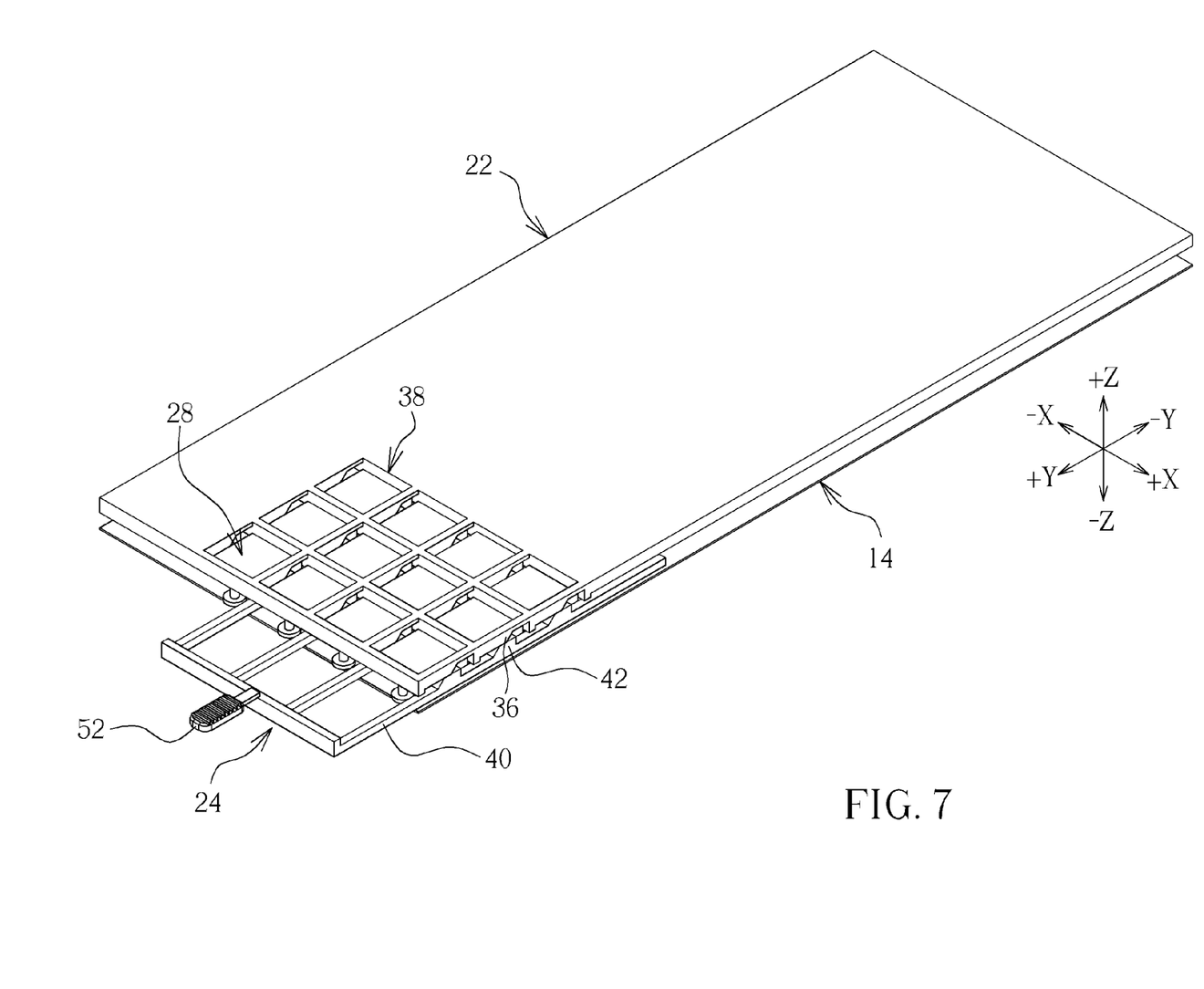
FIG. 7 is a diagram of the first driving part in FIG. 6 driving the support frame to move upwardly to the support position.

The second driving part 26 can be an omissible component for simplifying the mechanical design of the portable electronic device 10. To be more specific, in the configuration that the second driving part 26 and the fourth inclined surface structure 44 of the first driving part 24 are omitted, the portable electronic device 10 can only utilize motion of the first driving part 24 in the ±Y-axis directions to drive the support frame 22 to move to the support position or the retracted position in the ±Z-axis directions. The related design can be as shown in FIG. 6 and FIG. 7. FIG. 6 is a diagram of the first driving part 24 driving the support frame 22 to move downwardly to the retracted position according to a second embodiment of the present invention. FIG. 7 is a diagram of the first driving part 24 in FIG. 6 driving the support frame 22 to move upwardly to the support position. Components both mentioned in this embodiment and the aforesaid embodiment represent components with similar structures and functions, and the related description is omitted herein.

As shown in FIG. 6 and FIG. 7, in this embodiment, the first driving part 24 can further have a push button portion 52 without the fourth inclined surface structure 44. Accordingly, during the process that the push button portion 52 is pushed to move the first driving part 24 toward the +Y-axis direction from a position as shown in FIG. 6 to a position as shown in FIG. 7, the second inclined surface structure 42 can slide relative to the first inclined surface structure 36 on the support frame 22 with motion of the second inclined surface structure 42, so as to push the support frame 22 to move upwardly toward the +Z-axis direction from the retracted position as shown in FIG. 6 to the support position as shown in FIG. 7. In such a manner, the support frame 22 can protrude from the keyboard 14 so that the portable electronic device 10 can have a support function accordingly.

On the other hand, during the process that the push button portion 52 is pushed to move the first driving part 24 toward the −Y-axis direction from the position as shown in FIG. 7 to the position as shown in FIG. 6, the support frame 22 is pulled by gravity to move downwardly toward the −Z-axis direction from the support position as shown in FIG. 7 to the retracted position as shown in FIG. 6 since the first inclined surface structure 36 is no longer supported by the second inclined surface structure 42. In such a manner, the keyswitches 28 of the keyboard 14 can protrude from the holes 38 for the user to press conveniently.

Figure 8:
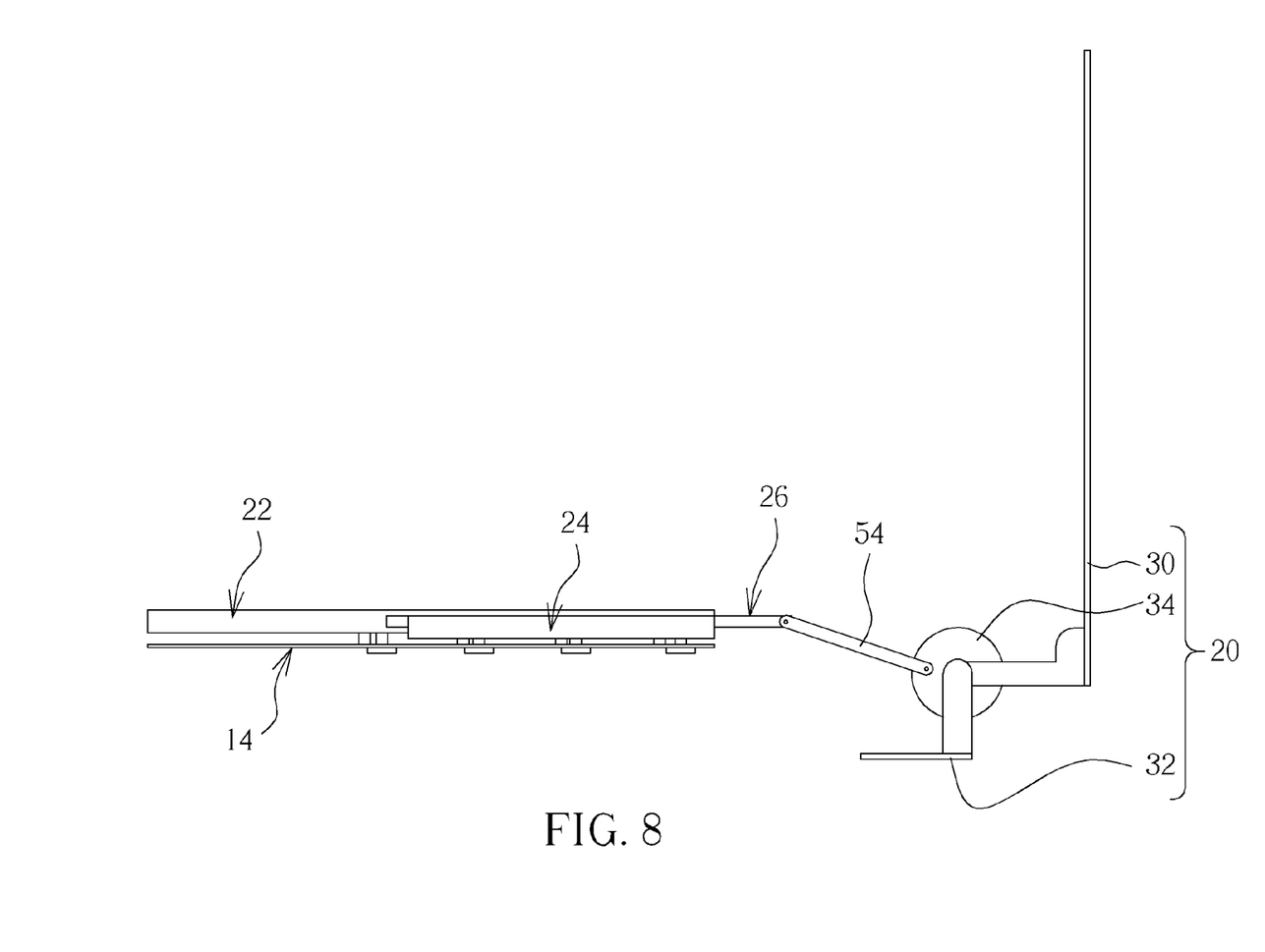
FIG. 8 is a side view of the second driving part driving the first driving part to make the support frame move downwardly to the retracted position according to a third embodiment of the present invention.
Figure 9:
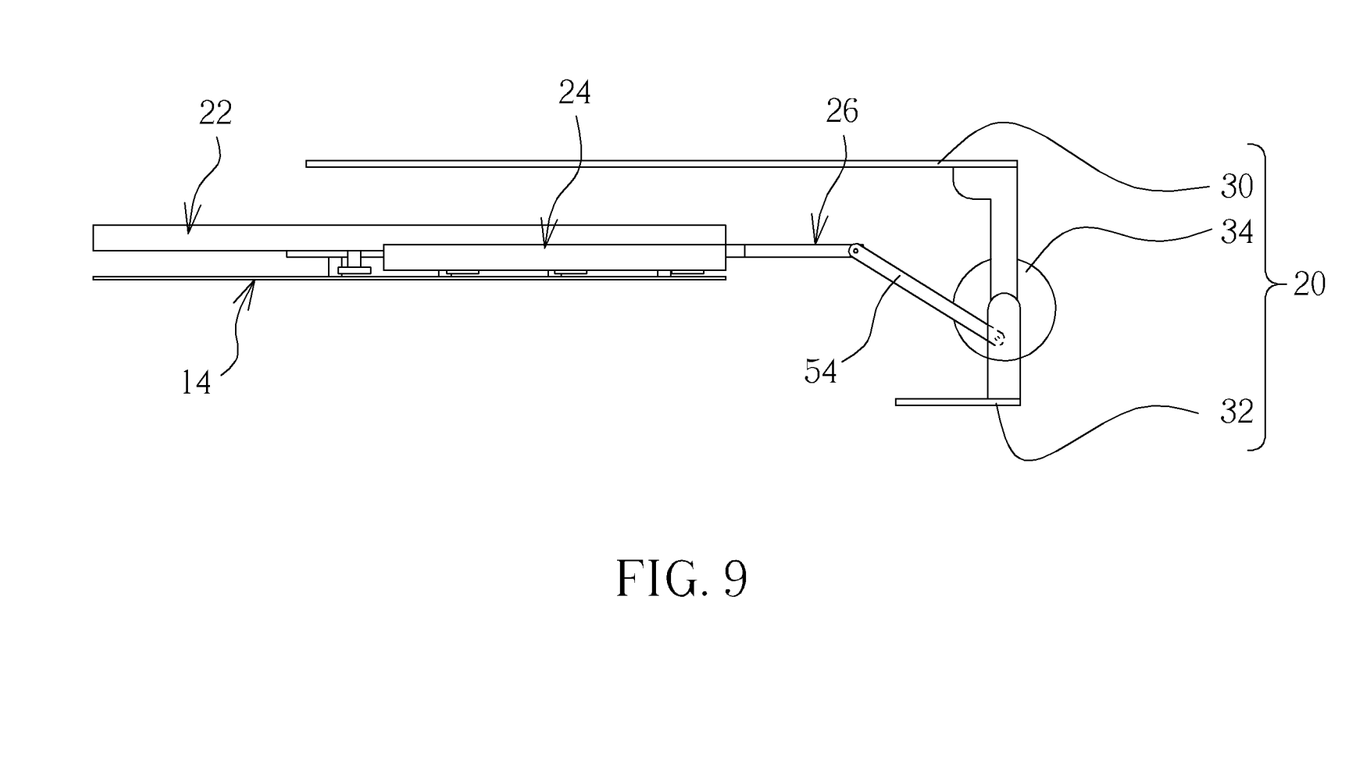
FIG. 9 is a side view of the second driving part in FIG. 8 driving the first driving part to make the support frame move upwardly to the support position.

As for the design for driving the second driving part 26 to move in the ±X-axis directions, it can also be not limited to the manual pushing design mentioned in the aforesaid embodiment. That is to say, the present invention can also utilize a linkage mechanism to be disposed on the portable electronic device 10 for driving the second driving part 26 to move simultaneously when the upper cover 18 and the lower cover 12 are rotated relatively. For example, please refer to FIG. 8 and FIG. 9. FIG. 8 is a side view of the second driving part 26 driving the first driving part 24 to make the support frame 22 move downwardly to the retracted position according to a third embodiment of the present invention. FIG. 9 is a side view of the second driving part 26 in FIG. 8 driving the first driving part 24 to make the support frame 22 move upwardly to the support position. Components both mentioned in this embodiment and the aforesaid embodiment represent components with similar structures and functions, and the related description is omitted herein.

As shown in FIG. 8 and FIG. 9, the portable electronic device 10 can further include a linkage part 54. The linkage part 54 is pivotally connected to the second driving part 26 and the pivot portion 34 for establishing a linkage mechanism between the second driving part 26 and the pivot portion 34.

Thus, during the process of folding the upper cover 18 upon the lower cover 12, the upper-cover connecting portion 30 and the pivot portion 34 are rotated with rotation of the upper cover 18 from a position as shown in FIG. 8 to a position as shown in FIG. 9. At the same time, the linkage part 54 pivotally connected to the second driving part 26 and the pivot portion 34 pulls the second driving part 26 from a position as shown in FIG. 8 to a position as shown in FIG. 9 with rotation of the pivot portion 34, so as to drive the first driving part 24 and the support frame 22 to slide relatively. In such a manner, the support frame 22 can move correspondingly from the retracted position as shown in FIG. 8 to the support position as shown in FIG. 9 when the upper cover 18 is folded upon the lower cover 12, for providing sufficient support force to the support target member 16. As for the related description for linkage of the first driving part 24 and the second driving part 26 and linkage of the support frame 22 and the first driving part 24, it can be reasoned by analogy according to the aforesaid embodiment and therefore omitted herein.

On the other hand, during the process of opening the upper cover 18, the upper-cover connecting portion 30 and the pivot portion 34 are rotated with rotation of the upper cover 18 from the position as shown in FIG. 9 to the position as shown in FIG. 8. At the same time, the linkage part 54 pivotally connected to the second driving part 26 and the pivot portion 34 pushes the second driving part 26 from the position as shown in FIG. 9 to the position as shown in FIG. 8 with rotation of the pivot portion 34, so as to drive the first driving part 24 and the support frame 22 to slide relatively. In such a manner, the support frame 22 can move correspondingly from the support position as shown in FIG. 9 to the retracted position as shown in FIG. 8 when the upper cover 18 is opened, so as to make the keyswitches 28 of the keyboard 14 protrude from the holes 28 for a user to press conveniently. Similarly, as for the related description for linkage of the first driving part 24 and the second driving part 26 and linkage of the support frame 22 and the first driving part 24, it can be reasoned by analogy according to the aforesaid embodiment and therefore omitted herein.

In summary, via the aforesaid linkage design that the linkage part 54 is pivotally connected to the second driving part 26 and the pivot portion 34, the support frame 22 can be driven to move to the support position or the retracted position simultaneously when the upper cover 18 is rotated. Accordingly, use convenience of the portable electronic device 10 in support and retracted operations can be further improved.

To be noted, the aforesaid design that the inclined surface structures cooperate with each other can also be applied to the second driving part 26 and the upper cover 18 instead of the aforesaid linkage design, so as to establish a linkage mechanism between the second driving part 26 and the upper cover 18. For example, the second driving part 26 and the upper cover 18 can have inclined surface structures, which cooperate with each other, so as to achieve the purpose of simultaneously driving the second driving part 26 to move when the upper cover 18 is rotated. As for which design is utilized, it depends on the practical application of the portable electronic device 10.

Compared with the prior art, the present invention utilizes the design that the driving part drives the support frame to move via the relative sliding of the inclined surface structures, to make the support frame capable of moving to the support position for providing sufficient plane support force to the support target member cooperatively with the lower cover. In such a manner, the portable electronic device provided by the present invention can greatly enhance the stress that the support target member can bear when the upper cover is folded upon the lower cover, so as to efficiently avoid damage of the support target member (e.g. a break of a glass cover of a liquid crystal display panel) when the support target member is pressed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device with a support function, the portable electronic device comprising:
   a lower cover;
   a keyboard disposed on the lower cover and having a plurality of keyswitches;
   an upper cover pivotally connected to a side of the lower cover;
   a support target member disposed on the upper cover;
   a support frame movably disposed on the keyboard and having at least one first inclined surface structure and a plurality of holes formed thereon corresponding to the plurality of keyswitches; and
   a first driving part movably disposed between the keyboard and the lower cover and having a second inclined surface structure thereon corresponding to the first inclined surface structure, the second inclined surface structure being used for sliding obliquely along the first inclined surface structure in a direction different from a first direction when the first driving part moves in the first direction relative to the support frame, so as to drive the support frame to move to a support position to be located above the keyboard and contact with the support target member for supporting the support target member or drive the support frame to move to a retracted position in a second direction;

wherein when the support frame moves to the support position, the second inclined surface structure supports the first inclined surface structure for supporting the support frame above the keyboard, so that the support frame can support the support target member when the upper cover covers the lower cover.

2. The portable electronic device of claim 1, wherein the first direction is substantially perpendicular to the second direction.

3. The portable electronic device of claim 1, wherein when the support frame moves to the refracted position, the second inclined surface structure slides along the first inclined surface structure to make the plurality of keyswitches protrude from the plurality of holes.

4. The portable electronic device of claim 1, wherein the first driving part further has at least one first driving rod portion, and the second inclined surface structure is formed on the first driving rod portion.

5. The portable electronic device of claim 4 further comprising:
   a second driving part movably disposed on the first driving part and having a third inclined surface structure, the first driving part having a fourth inclined surface structure corresponding to the third inclined surface structure, the third inclined surface structure being used for sliding relative to the fourth inclined surface structure to drive the first driving part to move in the first direction when the second driving part moves in a third direction relative to the first driving part.

6. The portable electronic device of claim 5, wherein the second driving part further has a second driving rod portion, and the third inclined surface structure is formed on the second driving rod portion.

7. The portable electronic device of claim 6, wherein the second driving part further has a push button portion.

8. The portable electronic device of claim 7 further comprising:
   a shaft part pivotally connected to the upper cover and the lower cover, the shaft part comprising:
   an upper-cover connecting portion fixed to the upper cover;
   a lower-cover connecting portion fixed to the lower cover; and
   a pivot portion connected to the upper-cover connecting portion and pivotally connected to the lower-cover connecting portion.

9. The portable electronic device of claim 4, wherein the first driving part further has a push button portion.

10. The portable electronic device of claim 1, wherein the first driving part further has a push button portion.

11. The portable electronic device of claim 1 further comprising:
   a second driving part movably disposed on the first driving part and having a third inclined surface structure, the first driving part having a fourth inclined surface structure corresponding to the third inclined surface structure, the third inclined surface structure being used for sliding relative to the fourth inclined surface structure to drive the first driving part to move in the first direction when the second driving part moves in a third direction relative to the first driving part.

12. The portable electronic device of claim 11, wherein the second driving part further has a second driving rod portion, and the third inclined surface structure is formed on the second driving rod portion.

13. The portable electronic device of claim 12, wherein the second driving part further has a push button portion.

14. The portable electronic device of claim 11, wherein the second driving part further has a push button portion.

15. The portable electronic device of claim 11 further comprising:
   a shaft part pivotally connected to the upper cover and the lower cover.

16. The portable electronic device of claim 15, wherein the shaft part comprising:
   an upper-cover connecting portion fixed to the upper cover;
   a lower-cover connecting portion fixed to the lower cover; and
   a pivot portion connected to the upper-cover connecting portion and pivotally connected to the lower-cover connecting portion.

17. The portable electronic device of claim 16 further comprising:
   a linkage part pivotally connected to the second driving part and the pivot portion, for driving the second driving part to move in the third direction relative to the first driving part when the pivot portion rotates relative to the lower-cover connecting portion.

18. The portable electronic device of claim 1 further comprising:
   a shaft part pivotally connected to the upper cover and the lower cover.

19. The portable electronic device of claim 18, wherein the shaft part comprising:
   an upper-cover connecting portion fixed to the upper cover;
   a lower-cover connecting portion fixed to the lower cover; and
   a pivot portion connected to the upper-cover connecting portion and pivotally connected to the lower-cover connecting portion.

20. The portable electronic device of claim 1, wherein the support target member is a liquid crystal display panel.

* * * * *